Oct. 23, 1928.
H. H. FRANKS
1,688,579
BELT PLACER
Filed Feb. 24, 1927
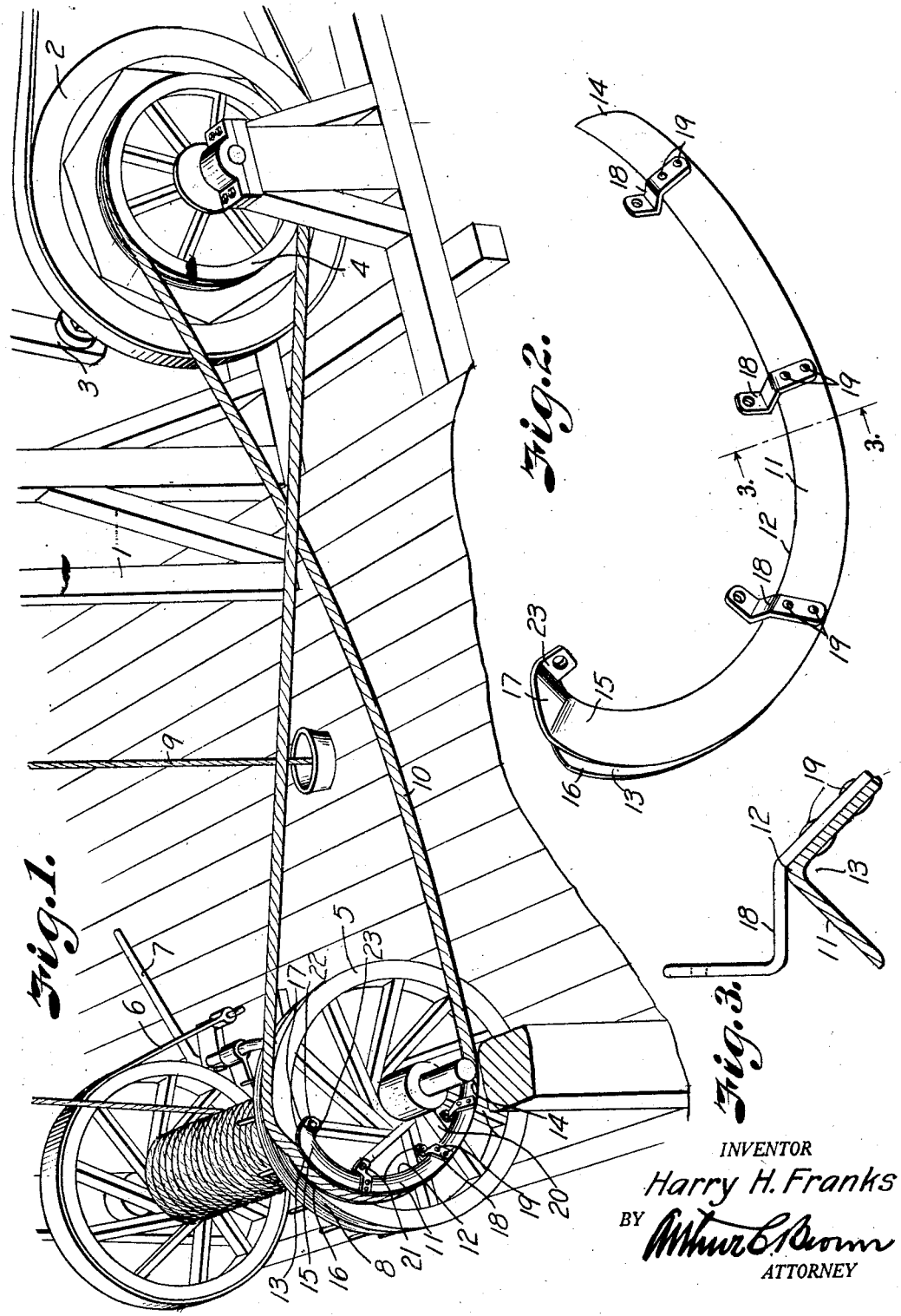
INVENTOR
*Harry H. Franks*
BY
ATTORNEY Patented Oct. 23, 1928.

1,688,579

UNITED STATES PATENT OFFICE.

HARRY H. FRANKS, OF TULSA, OKLAHOMA.

BELT PLACER.

Application filed February 24, 1927. Serial No. 170,496.

My invention relates to belt placers and more particularly to a device of that character for applying a belt or "bull rope" to the pulley of the "bull wheel" of an oil well drilling rig.

With rigs of this kind the band and bull wheels must be frequently connected and disconnected during drilling operations, and when connected the belt must be tight because of the heavy pulling strains to which it is subjected.

The connection between the wheels is made and broken by slipping the belt onto and from the bull wheel pulley; a difficult operation in view of the necessity for stretching the rope beyond its operative tautness in order to pass it over the pulley flange.

It is the object of my invention to provide a belt placer whereby power from the bull wheel may be applied to stretch the belt over the pulley flange for seating in the pulley groove.

In accomplishing this object I have provided improved details of structure, the preferred forms of which are illustrated in the accompanying drawings, wherein:—

Fig. 1 is a perspective view of part of a standard drilling rig, showing a bull wheel equipped with a belt placer constructed and assembled in accordance with my invention.

Fig. 2 is an enlarged detail perspective view of my rope placer.

Fig. 3 is a cross section of the rope placer on the line 3—3, Fig. 2.

Referring more in detail to the drawings:—

1 designates a derrick; 2 a band wheel with its pitman 3 and tug pulley 4; 5 a bull wheel comprising the usual brake band 6 with its lever 7 and the pulley groove 8 for receiving the belt or bull rope; and 9 the drill cable which is attached to the bull wheel and run thereunder from the derrick side. 10 designates the belt or bull rope which is adapted to travel in the tug pulley on the band wheel and in the pulley groove in the bull wheel to drive the bull wheel from the band wheel when the cable is to be wound on the drum to pull the tools. When the tools are to be let into the well, the belt is removed from the bull wheel to free the wheel so that the wheel may revolve rapidly under weight of the tools and under control of the band brake.

My belt placer, by which the belt or bull rope is installed in or returned to functional relation with the bull wheel, comprises a strip of angle iron 11 curved on an irregular arc of gradually decreasing radii, with the angle 12 innermost, so that the space between the flanges forms an outwardly facing V-groove or trough 13 for seating the belt or bull rope, as will presently be described; the angles at the long radius end of the strip being cut away on a curve, as at 14, to avoid sharp corners and edges which might damage a rope applied thereto.

At the short radius end of the strip, the outer angle flange 15 is extended beyond the inner flange 16 and turned outwardly in a lip 17 to form a mouth for receiving the rope and avoid a sharp edge which might damage the rope when the latter is being located in the placer.

The placer is adapted for attachment to the bull wheel by brackets 18, which are attached to the outer angle 15 by rivets or the like 19 and to spokes 20 of the wheel by bolts or the like 21, and also by a bolt 22 extended through an ear 23 on the out-turned lip 17 at the short radius end of the strip.

In assembling the placer on the bull wheel, the angle strip is attached to the spokes of the bull wheel with its long radius end adjacent the hub of the wheel and the short radius end adjacent the wheel rim, so that the bottom of the placer trough at the outer end of the placer is preferably slightly beyond the edge of the flange of the pulley groove of the wheel.

When the placer is so arranged and it is desired to connect the band and bull wheels, the bull wheel is turned to locate the mouth of the placer groove at the top of the wheel and the belt or bull rope is located in the tug pulley in the band wheel and seated partly in the bull wheel pulley groove and partly in the placer groove (Fig. 1). The band brake is then loosened to permit weight of the tools or of the drill cable to unwind the cable and thereby revolve the bull wheel anti-clockwise. As the wheel turns, friction of the rope in its V-shaped seat in the placer draws the rope along with the wheel, so that as rotation of the wheel continues, the rope is fed into the pulley groove and is finally completely seated therein.

When the rope is fully seated in the pulley groove, it is free of the placer and the latter rotates idly with the wheel.

While I have referred to specific use of the invention in connection with bull wheels for well drilling rigs, it is apparent that it is adaptable for use with wheels of different character.

What I claim and desire to secure by Letters Patent is:

1. In combination with a wheel having peripheral flanges forming a grooved rim, a belt placer comprising a strip of angle iron curved on an arc of gradually reducing radii with one of its walls lying against the rim of the wheel, and brackets on the outer wall of the angle member attached to the wheel to secure the placer to the wheel with the end of shorter radii adjacent the rim of the wheel.

2. In combination with a wheel having peripheral flanges forming a grooved rim, a belt placer comprising a strip of angle iron curved on an arc of gradually reducing radii with one of its walls lying against the rim of the wheel, and brackets on the outer wall of the angle member attached to the wheel to secure the placer to the wheel with the end of shorter radii adjacent the rim of the wheel, the outer wall of the angle member being extended beyond the inner wall of said member at the outer end of the placer, and the inner ends of the walls being curved for the purpose set forth.

In testimony whereof I affix my signature.

HARRY H. FRANKS.